(12) United States Patent
Brannon et al.

(10) Patent No.: US 6,314,814 B1
(45) Date of Patent: Nov. 13, 2001

(54) METHOD AND APPARATUS FOR PRECISE MEASUREMENT OF PRESSURE DEPENDENCE OF HEAD FLY HEIGHT USING TRANSITIONAL THERMAL SIGNALS

(75) Inventors: James Hammond Brannon, Palo Alto; Shanlin Duan, Fremont; Wai Cheung Leung, San Jose; Yan Liu, Cupertino; Li Tang, Fremont, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,369

(22) Filed: Mar. 1, 2000

(51) Int. Cl.$^7$ ........................................................ G01L 9/00
(52) U.S. Cl. ................................................................. 73/705
(58) Field of Search ........................... 73/705, 105, 1.81, 73/1.89; 250/252.1; 324/202, 212; 360/78.04

(56) References Cited

U.S. PATENT DOCUMENTS 6,092,412 * 7/2000 Flechsig et al. ...................... 73/105
6,142,006 * 11/2000 Marcho et al. ...................... 73/1.81
6,164,118 * 12/2000 Suzuki et al. ......................... 73/1.89

* cited by examiner

Primary Examiner—William Oen
(74) Attorney, Agent, or Firm—Altera Law Group, LLC

(57) ABSTRACT

A method and apparatus for precise measurement of pressure dependence of head fly height using transitional thermal signals is disclosed. A slider is positioned relative to a rotating a disk having at least one laser bump. Calibration data is gathered by decreasing the pressure and measuring the fly height until a contact positive TA signal is detected. A non-contact negative TA signal is then normalized using the gathered calibration data. The TA signal amplitude may then be used to ascertain the fly height and pressure for a head.

15 Claims, 6 Drawing Sheets

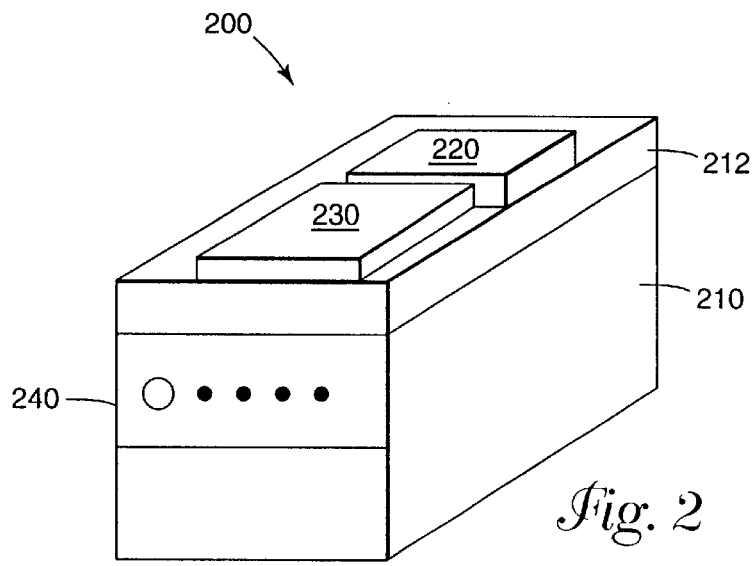
*Fig. 2*
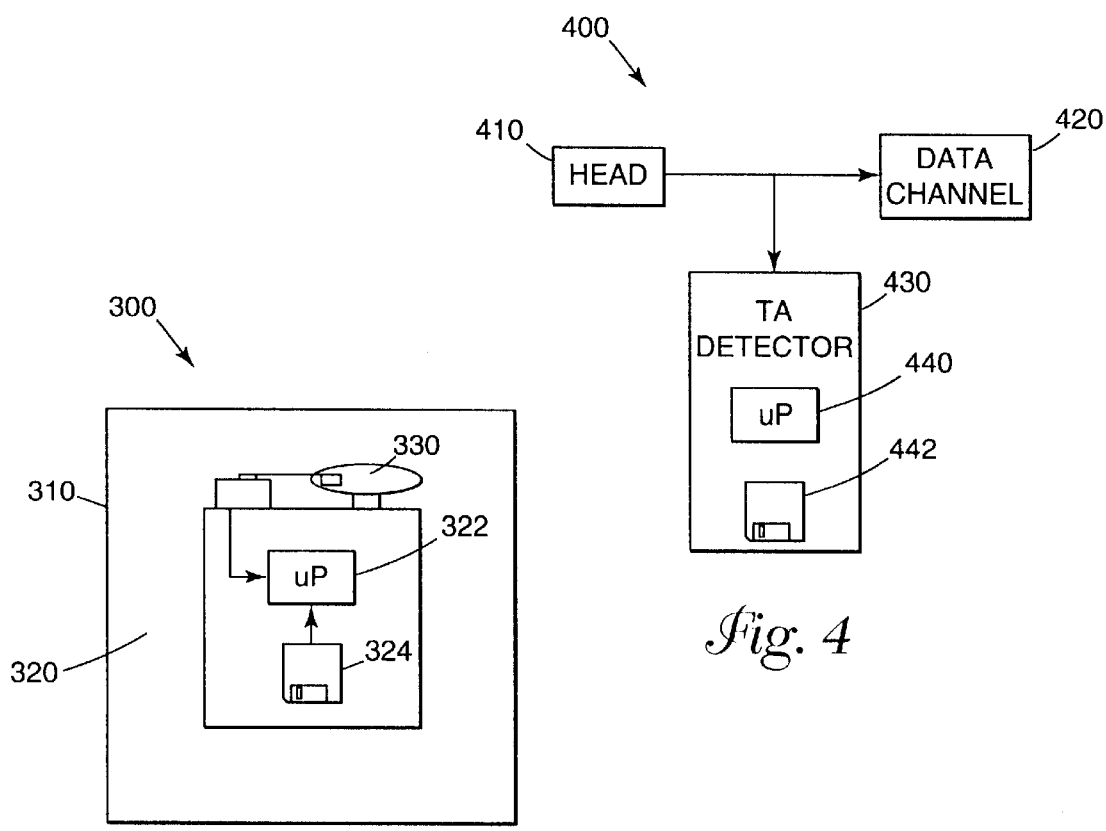
*Fig. 3*
*Fig. 4*

METHOD AND APPARATUS FOR PRECISE MEASUREMENT OF PRESSURE DEPENDENCE OF HEAD FLY HEIGHT USING TRANSITIONAL THERMAL SIGNALS

BACKGROUND OF THE INVENTION

1. Field of the Invention

This invention relates in general to fly height performance testing, and more particularly to a method and apparatus for precise measurement of pressure dependence of head fly height using transitional thermal signals.

2. Description of Related Art

Storage capacity governs the amount of data a user can store on a computer. Adding storage capacity without increasing size means denser radial spacing of tracks on disk drives. As a result, the read/write head element's magnetic sensitivity must also increase, which makes the manufacturing process even more demanding and acceptance testing more critical.

Conventional magnetic storage devices include a magnetic transducer or "head" suspended in close proximity to a recording medium, e.g., a magnetic disk having a plurality of concentric tracks. The transducer is supported by an air bearing slider mounted to a flexible suspension. The suspension, in turn, is attached to a positioning actuator. During normal operation, relative motion is provided between the head and the recording medium as the actuator dynamically positions the head over a desired track. The relative movement provides an air flow along the surface of the slider facing the medium, creating a lifting force. The lifting force us counterbalanced by a predetermined suspension load so that the slider is supported on a cushion of air. Air flow enters the leading edge of the slider and exits from the trailing end. The head resides toward the trailing end, which tends to fly closer to the recording surface than the leading edge.

The recording medium holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Another important factor affecting fly height is the slider's resistance to changing conditions. An air bearing slider is subjected to a variety of changing external conditions during normal operation. Changing conditions affecting fly height include, for example, change in the relative air speed and direction, pressure changes and variations in temperature. If the transducer fly height does not stay constant during changing conditions, data transfer between the transducer and the recording medium may be adversely affected. Fly height is further affected by physical characteristics of the slider such as the shape of the ABS. Careful rail shaping, for example, will provide some resistance to changes in air flow. To insure compliance with such design criteria the recording heads are typically tested in an apparatus commonly referred to as a fly height tester.

Head fly height in a disk drive is dependent on the attitude at which the drive is functioning for a variety of slider air bearing designs. The head usually flies lower at higher attitude, i.e. lower pressure. Accurate measurement of head fly height vs. pressure is of importance for air bearing and file design optimization as well as for further understanding of head flying dynamics mechanism. However, the sensitivities of fly height testers have not provided accuracy at the sub-nanometer (nm) level, which is required to verify the compliance of today's head. Moreover, the pressure dependence of head fly height has not been measurable.

It can be seen that there is a need for a method and apparatus for precise measurement of pressure dependence of head fly height.

SUMMARY OF THE INVENTION

To overcome the limitations in the prior art described above, and to overcome other limitations that will become apparent upon reading and understanding the present specification, the present invention discloses a method and apparatus for precise measurement of pressure dependence of head fly height using transitional thermal signals.

The present invention solves the above-described problems by positioning a slider relative to a rotating disk having at least one laser bump. Calibration data is gathered by decreasing the pressure and measuring the fly height until a contact positive TA signal is detected. A non-contact negative TA signal is then normalized using the gathered calibration data. The TA signal amplitude may then be used to ascertain the fly height and pressure for a head.

A method in accordance with the principles of the present invention includes positioning a slider over a rotating disk having at least one laser bump, gathering calibration data by decreasing the pressure and measuring the fly height until a contact positive TA signal is detected, normalizing a non-contact negative TA signal using the gathered calibration data and determining a fly height and pressure for a head using the normalized non-contact thermal asperity signal.

Other embodiments of a method in accordance with the principles of the invention may include alternative or optional additional aspects. One such aspect of the present invention is that the at least one laser bump comprises three laser bumps.

Another aspect of the present invention is that the normalized non-contact thermal asperity signal provides fly height measurements with sub-nanometer sensitivity.

Another aspect of the present invention is that the determining the fly height of a head comprises detecting when the head contacts a laser bump of a known height.

Another aspect of the present invention is that the detecting when the head contacts a laser bump comprises observing when a positive contact thermal asperity signal is produced.

In another embodiment of the present invention a system for precisely measuring pressure dependence of head fly height using transitional thermal signals includes an environmental chamber for controlling the pressure therein and a spin stand, disposed within the environment chamber, the spin stand providing a disk having a plurality of laser bumps thereon with known bump heights and dimensions for interaction with a head, the spin stand further including a processor for decreasing the pressure within the environmental chamber and measuring the fly height at a plurality of pressures until a contact positive thermal asperity signal is detected, wherein the processor normalizes a non-contact thermal asperity signal using the fly height and corresponding pressure measurements and wherein the processor uses the normalized non-contact thermal asperity signal to determine the fly height and pressure for a head.

In another embodiment of the present invention an article of manufacture includes a program storage medium readable by a computer, the medium tangibly embodying one or more programs of instructions executable by the computer to precisely measure pressure dependence of head fly height using transitional thermal signals, the method including positioning a slider over a rotating disk having at least one laser bump, gathering calibration data by decreasing the pressure and measuring the fly height until a contact positive TA signal is detected, normalizing a non-contact negative TA signal using the gathered calibration data; and determining a fly height and pressure for a head using the normalized non-contact thermal asperity signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a spin stand for performing precise measurement of pressure dependence of head fly height using transitional thermal signals according to the present invention;

FIG. 3 illustrates a system for precise measurement of pressure dependence of head fly height using transitional thermal signals according to the present invention;

FIG. 4 illustrates a system that includes a thermal asperity (TA) detector that provides the transitional thermal signal detecting according to the present invention

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention is capable of determining the pressure dependence of MR/GMR head fly height using transitional thermal signal detected by magnetoresistive (MR)/giant magnetoresistive (GMR) read elements. The present invention measures fly height lower than 10 nanometer reliably with sub-nanometer sensitivity. This system also enables us to study thermal asperity sensitivity of MR/GMR heads for magnetic recording.

Figure 1:
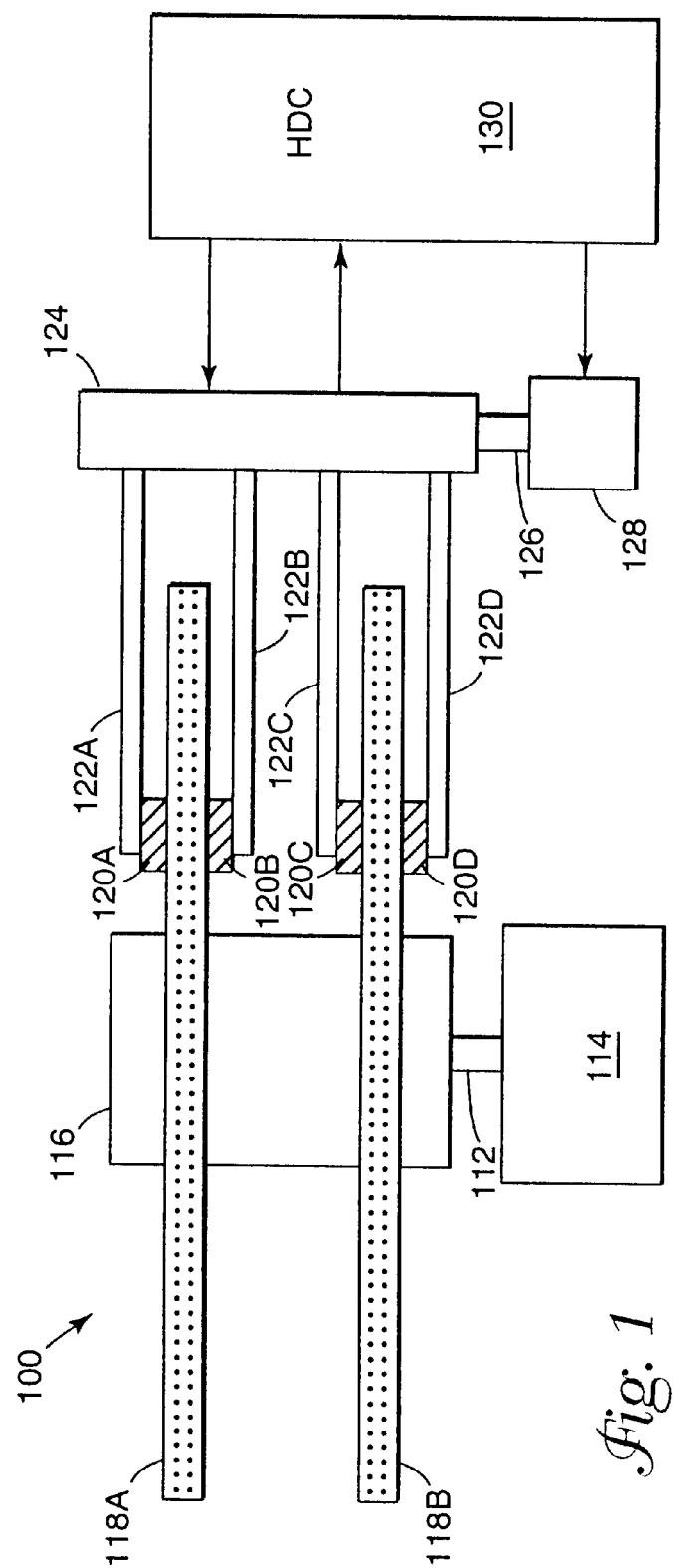
FIG. 1 illustrates a hard disk drive (HDD) including disks.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

FIG. 2 illustrates a spin stand 200 for performing precise measurement of pressure dependence of head fly height using transitional thermal signals according to the present invention. A spin stand includes a support frame 210 for providing isolation to a device under test. A granite base 212 provides a rigid platform for the tester. The tester includes a micro-positioning stage 220 for X-Y movement of a head under test and an air-bearing spindle stage 230 for rotating a medium relative to the head. A motion controller 240 controls the movement of each of the stages 220, 230.

FIG. 3 illustrates a system 300 for precise measurement of pressure dependence of head fly height using transitional thermal signals according to the present invention. In FIG. 3, the system 300 includes an environmental chamber 310. The environmental chamber 310 is capable of changing pressure from 1.0 atm. to 0.01 atm. (0–100,000 feet). A spin stand 320 sits inside the environment chamber along with related (processor) electronics 322/software 324 for transitional thermal signal detecting. Thus, the electronics 322 may be configured by program storage media 324. The media 324 tangibly embodies one or more programs of instructions executable by the processor 322 to perform the methods illustrated below with reference to FIGS. 6–8. The media provided by the spin stand is a laser bump disk 330 (e.g., glass or AlMg substrates) with known bump heights and dimensions.

FIG. 4 illustrates a system 400 that includes a thermal asperity (TA) detector 430 that provides the transitional thermal signal detecting according to the present invention. The thermal signal 402 is defined here as the signal due to electric resistance change induced by temperature change of a MR/GMR read element 410. A TA detector detects a signal amplitude $V_p$, typically between the MR/GMR read element 410 and the data channel 420. The TA detector 430 includes a processor 440 for processing the signal amplitude $V_p$. The processor may be configured by program storage medium 442. The media 442 tangibly embodies one or more programs of instructions executable by the processor to perform the methods illustrated with reference to FIGS. 6–8 below.

Figure 5:
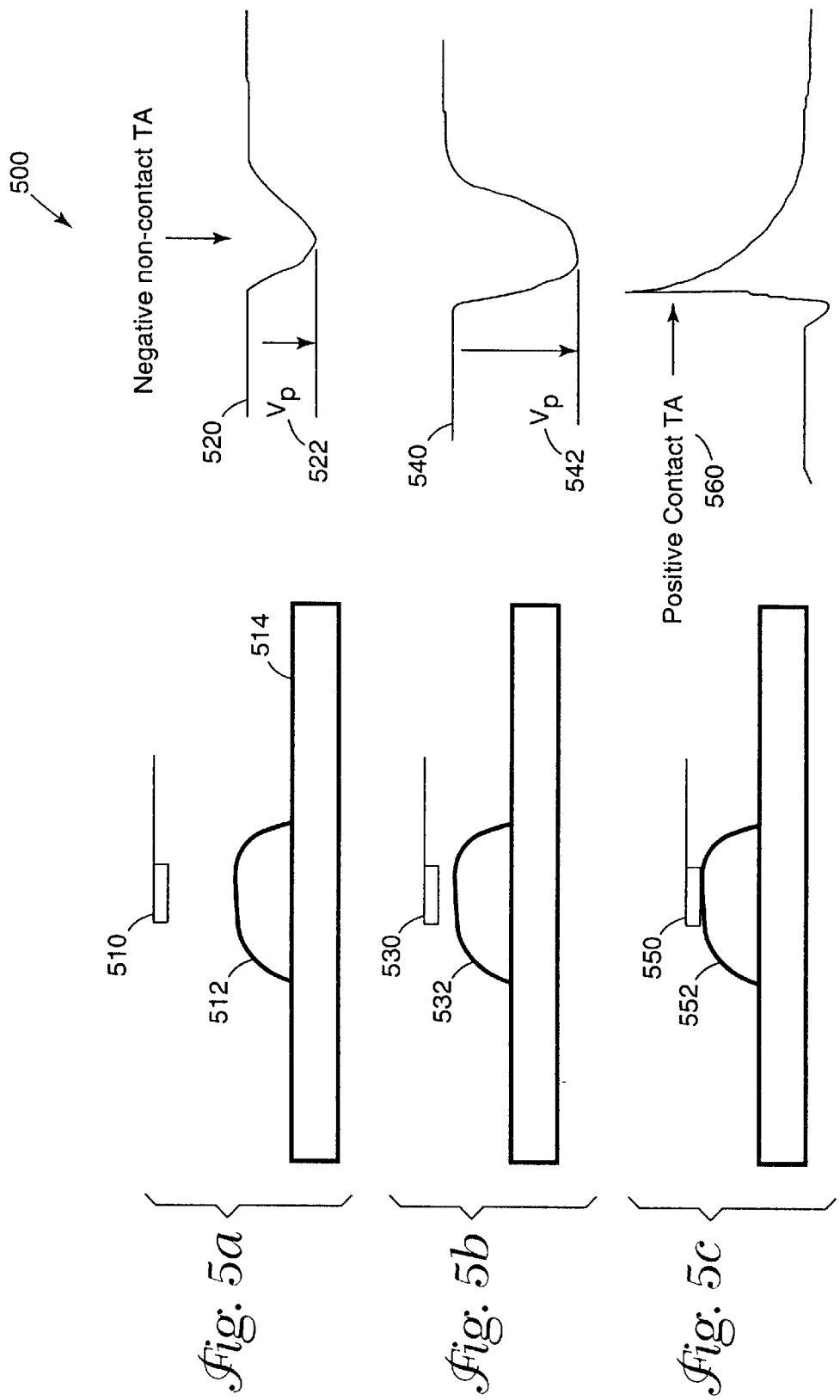
FIGS. 5a–c illustrate the transitional thermal signal used to provide precise measurement of pressure dependence of head fly height according to the present invention.

FIGS. 5a–c illustrate the transitional thermal signal 500 used to provide precise measurement of pressure dependence of head fly height according to the present invention. In FIG. 5a, a head 510 is shown flying above a laser bump 512 on a disk 514, wherein the laser bump 512 is of a known bump height and dimension. When an MR/GMR read element 510 is flying over a bump 512, its temperature is dependent on the distance between the element 510 and the bump 512. Since the bump is closer to the element than disk surface, the element's 510 temperature drops as it flying over the bump 512. Consequently a typical non-contact negative thermal asperity (TA) signal with an amplitude of Vp 522 will be detected.

In FIG. 5b, the head 530 is shown flying closer to the a laser bump 532. The head 530 generates a negative non-contact TA signal with a greater signal amplitude $V_p$ 540. The amplitude 542 of this signal increases with decreasing bump-head distance.

In FIG. 5c, the head 550 is shown actually in contact with the laser bump 552. When the fly height of the head 550 drops to the height of the bump 552 with lowing pressure, the head 550 starts to contact the bump 552. The frictional heat induced due to this head-bump contact raises the MR/GMR read element temperature and thus a contact positive thermal asperity signal 560 will be detected. The transition from the non-contact negative TA signal 540 to the contact positive TA signal 560 is the point at which the head is flying at the same height as the bump height. This transition occurs with a sub-nm sensitivity.

Figure 6:
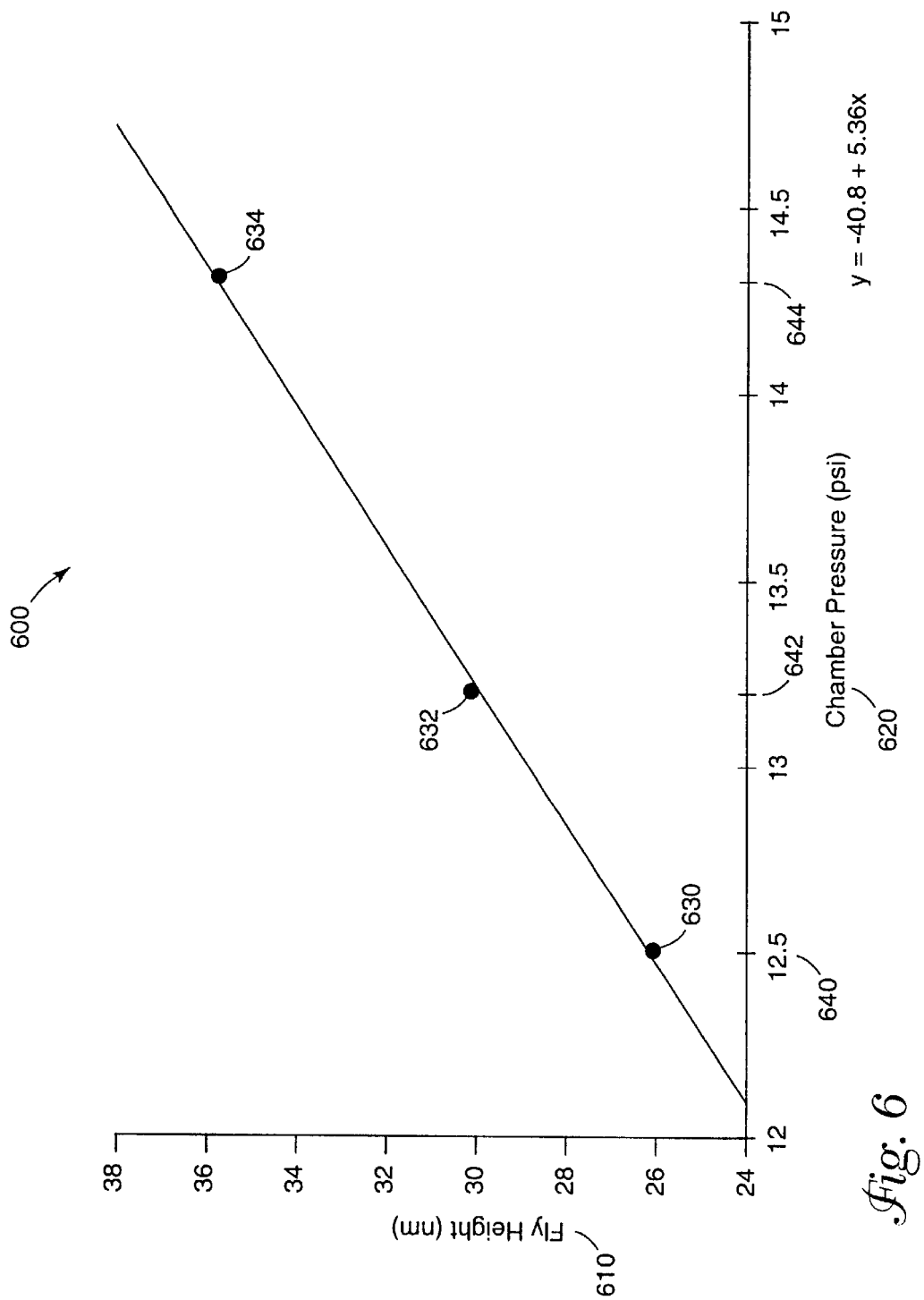
FIG. 6 is a graph that shows the fly height vs. pressure for a head using three bumps.

With a series of bumps of different height, the calibration curve of fly height vs. pressure could be obtained. FIG. 6 is a graph 600 that shows the fly height 610 vs. pressure 620 for a head using three bumps of 26.0 nm 630, 30.2 nm 632, and 35.8 nm 634 high on a glass disk. The three bumps 630, 632, 634 are at 1.5 in radius of the disk rotating at 5400 RPM. However, those skilled in the art will recognize that the present invention is not meant to be limited to the particular bump height and dimensions or the rotation speed of the disk. Rather, the height and dimensions, and the rotation speed of the disk, are merely used herein for description of the operation of the invention.

In FIG. 6, the pressure is decreased until the slider contacts the bumps. With three bumps of three different heights, as shown in FIG. 6, the pressure associated with each of the fly heights at bump contact can be determined. For example, the bump having a height of 26 nm 630 is contacted by the head when the pressure is 12.5 pounds per square inch (psi) 640. Likewise, the bump having a height of 30.2 nm 632 is contacted by the head when the pressure is about 13.2 psi 642 and the bump having a height of 35.8 nm 634 is contacted by the head when the pressure is 14.3 psi 644.

From this information, a plot of the fly height vs. pressure can be obtained. This calibration curve is used to normalize the non-contact negative TA signal. In other words the pressure dependence of head fly height can be even determined using a single bump.

Figure 7:
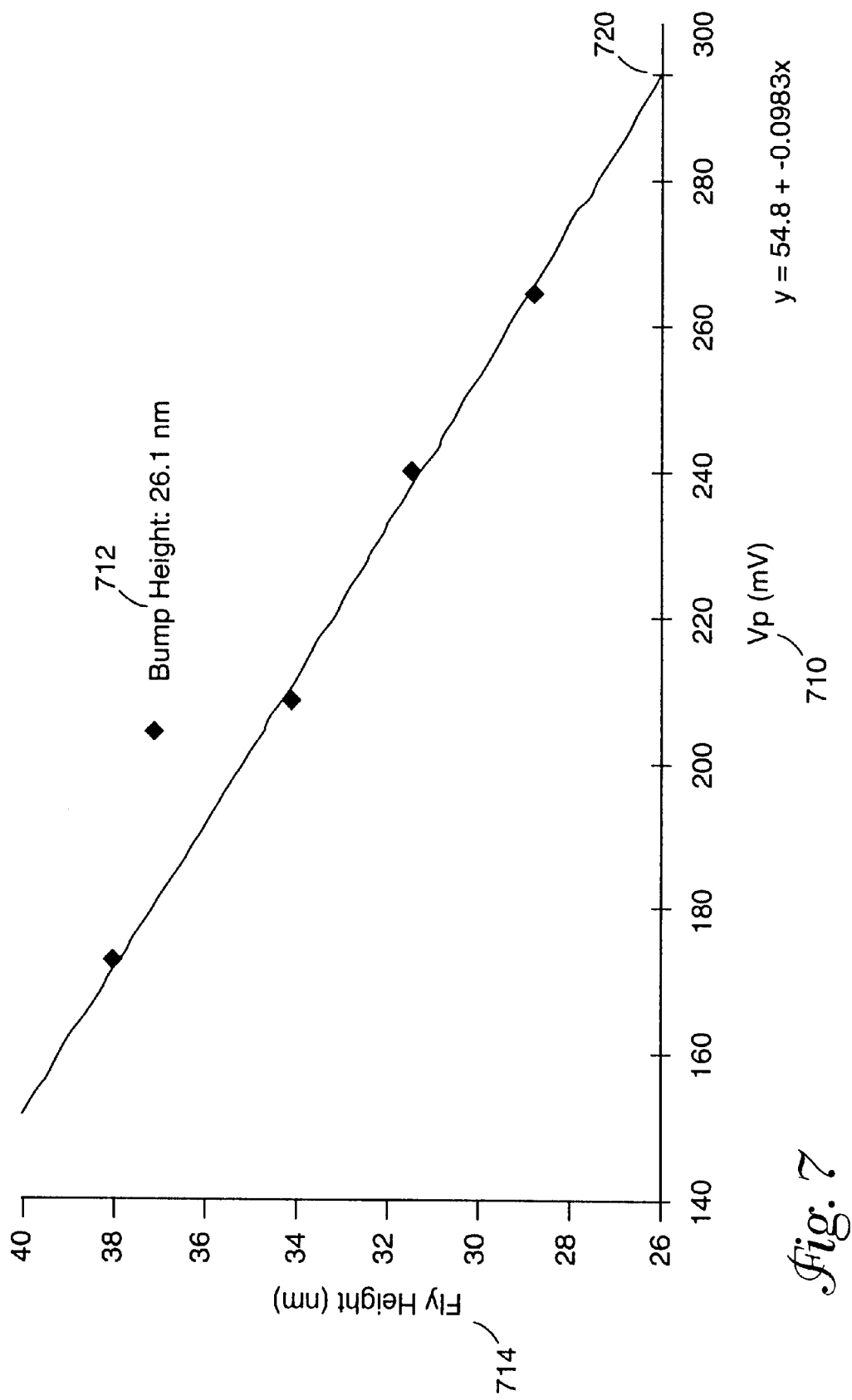
FIG. 7 is a graph that correlates the non-contact negative TA signal amplitude $V_p$ of a 26.1 nm high bump with the fly height for the head.

FIG. 7 is a graph 700 that correlates the non-contact negative TA signal amplitude $V_p$ 710 of the 26.1 nm high bump 712 with the fly height 714 for the head. In FIG. 7, the TA signal amplitude $V_p$ 710 increases until the fly height of the bump is obtained, i.e., the TA signal amplitude $V_p$ of about 290 millivolts (mV) 720.

Figure 8:
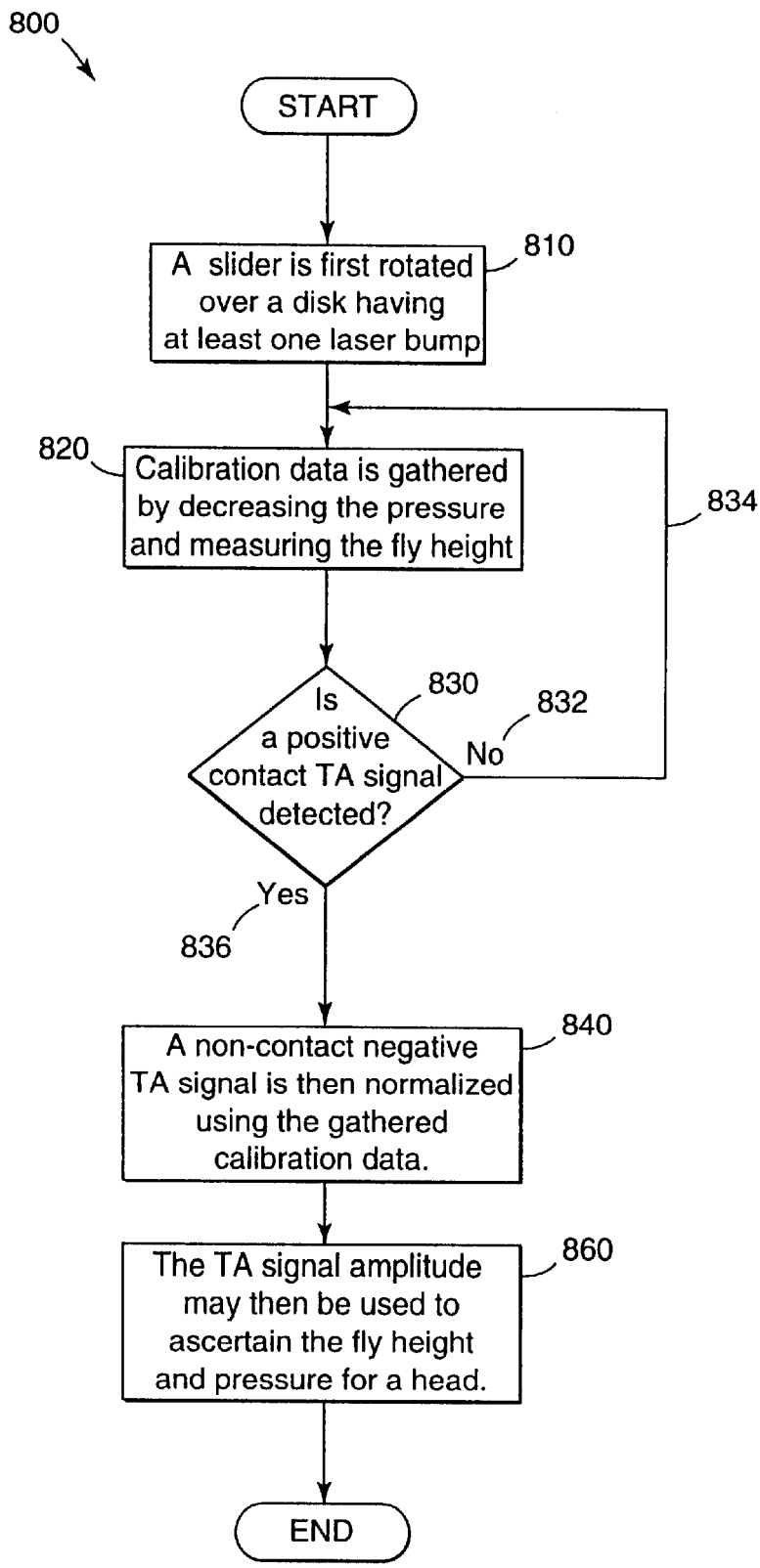
FIG. 8 illustrates a flow chart of the method for providing precise measurement of pressure dependence of head fly height using transitional thermal signals according to the present invention.

FIG. 8 illustrates a flow chart 800 of the method for providing precise measurement of pressure dependence of head fly height using transitional thermal signals according to the present invention. A slider is first positioned over a rotating disk having at least one laser bump 710. Calibration data is gathered by decreasing the pressure and measuring the fly height 820 until a determination 830 is made that a contact positive TA signal is detected 836. If a positive contact TA signal is not detected 832, further data is gathered 834. A non-contact negative TA signal is then normalized using the gathered calibration data 840. The TA signal amplitude may then be used to ascertain the fly height and pressure for a head 860.

In summary, the present invention can be applied to all magnetic recording heads with MR/GMR read elements for fly height measurement as low as a few nm accurately. The present invention can also be applied for disk glide height measurement. The present invention provides sub-nanometer sensitivity in measuring MR/GMR fly height. In addition the present invention does not require the head to contact the bump when doing the fly height measurement once the system is calibrated.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for precisely measuring pressure dependence of head fly height using transitional thermal signals, comprising:

an environmental chamber for controlling the pressure therein; and a spin stand, disposed within the environment chamber, the spin stand providing a disk having a plurality of laser bumps thereon with known bump heights and dimensions for interaction with a head, the spin stand further including a processor for decreasing the pressure within the environmental chamber and measuring the fly height at a plurality of pressures until a contact positive thermal asperity signal is detected, wherein the processor normalizes a non-contact thermal asperity signal using the fly height and corresponding pressure measurements and wherein the processor uses the normalized non-contact thermal asperity signal to determine the fly height and pressure for a head.

2. The system of claim 1 wherein the plurality of laser bumps comprises three laser bumps.

3. The system of claim 1 wherein the normalized non-contact thermal asperity signal provides fly height measurements with sub-nanometer sensitivity.

4. The system of claim 1 wherein the processor determines fly height of the head by detecting when the head contacts a laser bump of a known height.

5. The system of claim 4 wherein the processor detects when the head contacts a laser bump by observing when a positive contact thermal asperity signal is produced.

6. A method for precisely measuring pressure dependence of head fly height using transitional thermal signals, comprising:

positioning a slider over a rotating disk having at least one laser bump;

gathering calibration data by decreasing the pressure and measuring the fly height until a contact positive TA signal is detected;

normalizing a non-contact negative TA signal using the gathered calibration data; and determining a fly height and pressure for a head using the normalized non-contact thermal asperity signal.

7. The method of claim 6 wherein the at least one laser bump comprises three laser bumps.

8. The method of claim 6 wherein the normalized non-contact thermal asperity signal provides fly height measurements with sub-nanometer sensitivity.

9. The method of claim 6 wherein the determining the fly height of a head comprises detecting when the head contacts a laser bump of a known height.

10. The method of claim 9 wherein the detecting when the head contacts a laser bump comprises observing when a positive contact thermal asperity signal is produced.

11. An article of manufacture comprising a program storage medium readable by a computer, the medium tangibly embodying one or more programs of instructions executable by the computer to precisely measure pressure dependence of head fly height using transitional thermal signals, the method comprising:

positioning a slider over a rotating disk having at least one laser bump;

gathering calibration data by decreasing the pressure and measuring the fly height until a contact positive TA signal is detected;

normalizing a non-contact negative TA signal using the gathered calibration data; and determining a fly height and pressure for a head using the normalized non-contact thermal asperity signal.

12. The article of manufacture of claim 11 wherein the at least one laser bump comprises three laser bumps.

13. The article of manufacture of claim 11 wherein the normalized non-contact thermal asperity signal provides fly height measurements with sub-nanometer sensitivity.

14. The article of manufacture of claim 11 wherein the determining the fly height of a head comprises detecting when the head contacts a laser bump of a known height.

15. The article of manufacture of claim 14 wherein the detecting when the head contacts a laser bump comprises observing when a positive contact thermal asperity signal is produced.

* * * * *

UNITED STATES PATENT AND TRADEMARK OFFICE
CERTIFICATE OF CORRECTION

PATENT NO. : 6,314,814 B1
DATED : November 13, 2001
INVENTOR(S) : Brannon et al.

It is certified that error appears in the above-identified patent and that said Letters Patent is hereby corrected as shown below:

Column 1,
Line 32, replace "us" with -- is --;

Column 2,
Line 39, delete "the";

Column 3,
Line 38, add -- ; -- after 'invention';

Column 4,
Line 10, delete "the" after 'that';

Column 5,
Line 4, add -- is -- after 'it';
Line 8, delete "a";

Column 6,
Line 63, delete "the" after 'wherein';

Column 8,
Line 5, delete "the" after 'wherein'.

Signed and Sealed this

Seventeenth Day of September, 2002

Attest:

JAMES E. ROGAN
*Attesting Officer*     *Director of the United States Patent and Trademark Office*